Figure 1:
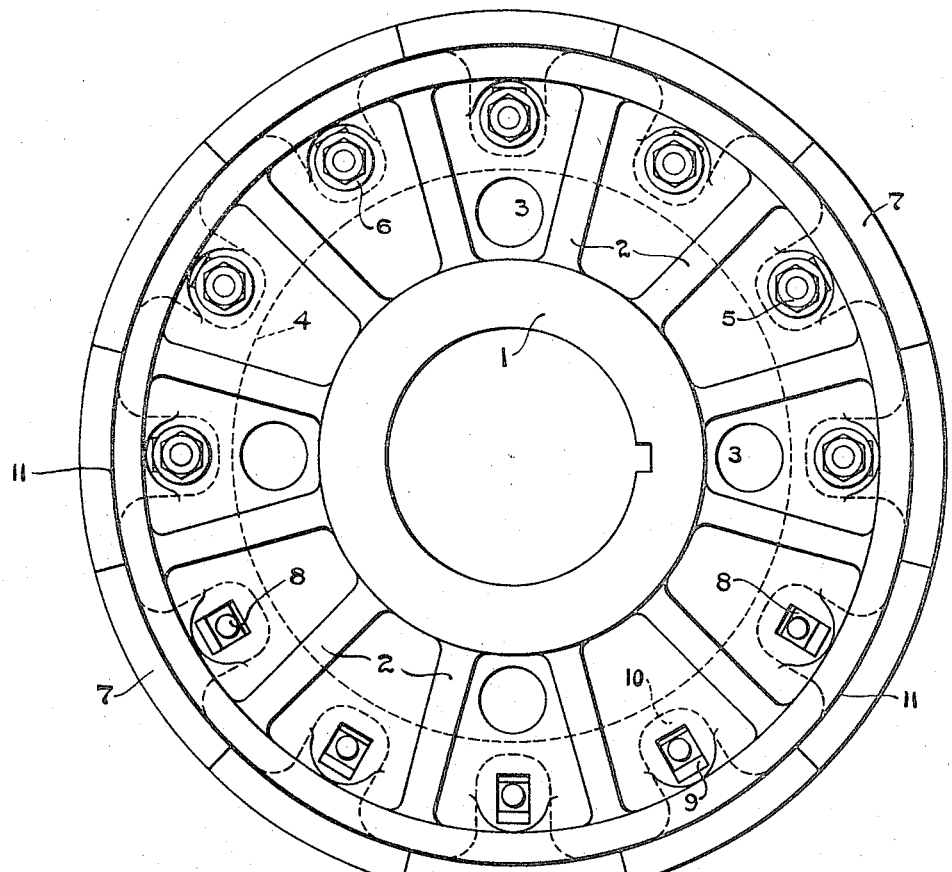

C. A. FISCHER.
GIB AND KEY.
APPLICATION FILED AUG. 15, 1910.

1,106,934.

Patented Aug. 11, 1914.

WITNESSES-
W. H. Lieber
Ella Brickell

INVENTOR-
C. A. Fischer
BY
ATTORNEY-

UNITED STATES PATENT OFFICE.

CHARLES A. FISCHER, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

GIB AND KEY.

1,106,934.  Specification of Letters Patent.  Patented Aug. 11, 1914.

Application filed August 15, 1910. Serial No. 577,202.

*To all whom it may concern:*

Be it known that I, CHARLES A. FISCHER, a citizen of the United States, residing at Milwaukee, in the county of Milwaukee and State of Wisconsin, have invented a certain new and useful Improvement in Gibs and Keys, of which the following is a specification.

This invention relates to improvements in the construction of the gib and key fastening for crushing rolls and more particularly to means for fastening the shell segments to rolls of relatively large diameter.

The invention is of general application as a gib and key but is disclosed herein as applied to crushing rolls.

The object of the invention is to provide a means for fastening a sectional roll shell to the roller head of a crushing roll, which is simple in construction, efficient in operation, and by means of which the section of the shell can be easily removed from or fastened to the roll head.

A clear conception of one embodiment of the invention can be obtained by referring to the accompanying drawing in which like reference characters designate the same or similar parts in like or different views.

Figure 2:
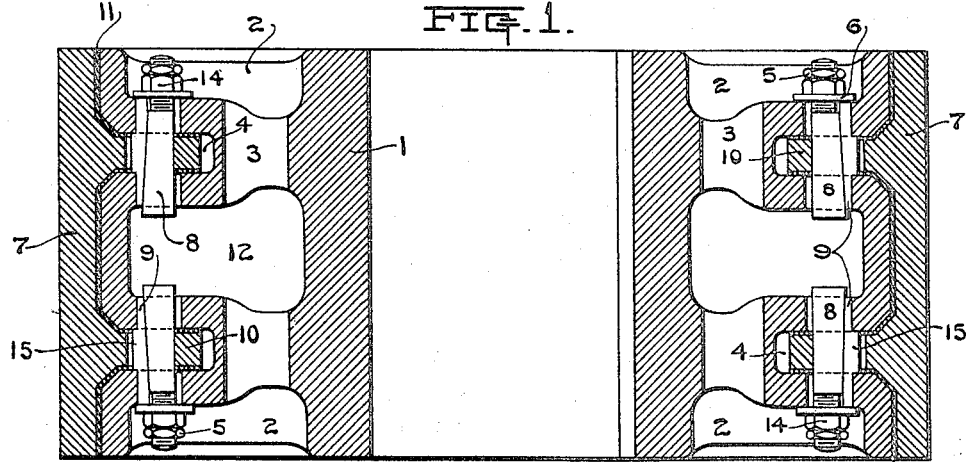

Figure 1 is an end elevation of a crushing roll having a sectional shell, the clamping nuts and washers being omitted from the lower shell fastening wedges of the disclosure. Fig. 2 is a horizontal transverse section of the device shown in Fig. 1.

The roller head 1 consists essentially of a cylindrical hub which is surrounded by a cylindrical shell-supporting rim, the rim and hub being connected by two parallel ribs having an annular space 12 formed between them. The connecting ribs are penetrated by cored holes 3, by means of which the core for forming the space 12 is supported during casting of the roll head 1. Radial ribs 2 project outwardly from the parallel ribs connecting the rim and the hub of the roll head 1.

Parallel annular grooves 4 extend inwardly from the periphery of the rim of the head 1 and constitute recesses and if so desired may be more than two in number. The shell sections 7 having the inwardly extending projections 10 formed thereon, coact against a coating of lead or babbitt 11, which in turn coacts against the outer periphery of the roll head 1. The projections 10 formed on the shell section 7 coact within the recesses or annular grooves 4 extending nearly to the bottom of said grooves. Wedges or keys 8 coact with their surfaces which are nearest the roll center, against corresponding surfaces of rectangular holes formed through the projections 10 of the sections 7. The opposite and tapered surfaces of the wedges 8 coact against surfaces of wedge blocks 9 nearest the roll center, the outer surfaces of the wedge blocks 9 coacting against corresponding surfaces of rectangular openings formed on the roll head 1. The wedge blocks or gibs 9 have short projections 15 which are of a width equal to that of the grooves 4, and which normally extend slightly outward into the groove 4, thus locking the blocks in place and preventing the same from slipping endwise.

The washers 6, nuts 14 and lock nuts 5 are placed on the projecting rounded and threaded ends of the wedges 8 or on bolts extending through the wedges.

In fastening the shell sections 7 to the roll head 1, the sections are so located that the openings formed through the projections 10 thereof partly register with the corresponding openings formed through the parallel ribs of the roll head 1. The wedges 8 are then inserted into the partly registered openings from the ends of the roll to a position nearer the mid plane of the roll than they will finally have. The wedge blocks 9 are slipped into place, the projections 15 being sufficiently short to permit such insertion, after which the wedges 8 are brought forward sufficiently to tighten all the parts. The washers 6 and lock nuts 5 are then applied.

It will be noted that with the construction of wedge 8 and wedge block 9, as shown, the surfaces of coaction between the wedge 8 and shell 7, and between the wedge block 9 and the roll head 1, are parallel surfaces which are comparatively easy to machine. The wedge surfaces of coaction are formed on the relatively small and easily machined wedges 8 and wedge blocks 9. The projection 15 on the wedge blocks 9 provides a simple means for locking these blocks in position, and also permit of easy removal of the block. The use of the block 9 permits the insertion and removal of the wedges 8 from the ends of the roll instead of from the center of the roll as heretofore.

It should be understood that it is not desired to be limited to the exact details of construction shown and described, for obvious modifications will occur to a person skilled in the art.

It is claimed and desired to secure by Letters Patent,—

The combination of two parts, one of the parts having a recess and the second part projecting into said recess, partly registrable openings formed in the parts across the recess, a gib block inserted in said openings, said gib block spanning said recess and having a projection extending into the said recess and fitting against the walls thereof, a wedge inserted in said openings, and means for advancing said wedge into contact with said second part and with said gib block to force said gib block against said recessed part.

In testimony whereof, I affix my signature in the presence of two witnesses.

CHARLES A. FISCHER.

Witnesses:
CHAS. L. BYRON,
W. H. LIEBER.